(12) United States Patent
Newell

(10) Patent No.: US 11,399,215 B2
(45) Date of Patent: *Jul. 26, 2022

(54) DYNAMIC CONTENT SELECTION MENU

(71) Applicant: DISH Technologies L.L.C., Englewood, CO (US)

(72) Inventor: Nicholas B. Newell, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,954

(22) Filed: Jun. 14, 2017

(65) Prior Publication Data

US 2017/0289637 A1  Oct. 5, 2017

Related U.S. Application Data

(63) Continuation of application No. 14/697,399, filed on Apr. 27, 2015, now Pat. No. 9,712,882.

(51) Int. Cl.
*H04N 21/482* (2011.01)
*H04N 21/431* (2011.01)
*H04N 21/462* (2011.01)

(52) U.S. Cl.
CPC ......... *H04N 21/482* (2013.01); *H04N 21/431* (2013.01); *H04N 21/462* (2013.01)

(58) Field of Classification Search
CPC ... H04N 21/482; H04N 21/431; H04N 21/462
See application file for complete search history.

(56) References Cited

U.S. PATENT DOCUMENTS

| | | | |
|---|---|---|---|
| 2005/0097606 A1 | 5/2005 | Scott, III et al. | |
| 2006/0271955 A1 | 11/2006 | Saito et al. | |
| 2007/0136756 A1 | 6/2007 | Ishida et al. | |
| 2008/0313673 A1 | 12/2008 | Morris | |
| 2010/0058213 A1 | 3/2010 | Higuchi et al. | |
| 2012/0272185 A1 | 10/2012 | Dodson et al. | |
| 2014/0259072 A1 | 9/2014 | Chuang et al. | |
| 2014/0267548 A1* | 9/2014 | Yee .......................... | G06F 3/017 348/14.03 |
| 2014/0373063 A1 | 12/2014 | Funk et al. | |

* cited by examiner

*Primary Examiner* — Jefferey F Harold
*Assistant Examiner* — Alexander Boyd
(74) *Attorney, Agent, or Firm* — Seed IP Law Group LLP

(57) ABSTRACT

A content selection menu is generated and provided to a user. The content selection menu includes a plurality of audiovisual (AV) programs that are provided for user selection. The AV programs may be positioned in the content selection menu in accordance with their associated score for content attributes. Upon providing the content selection to a user, the user may select a program for viewing or the user may indicate interest in a program. If the user indicates interest in a program a second content selection menu is generated based at least in part on the attributes of the program of interest.

13 Claims, 8 Drawing Sheets

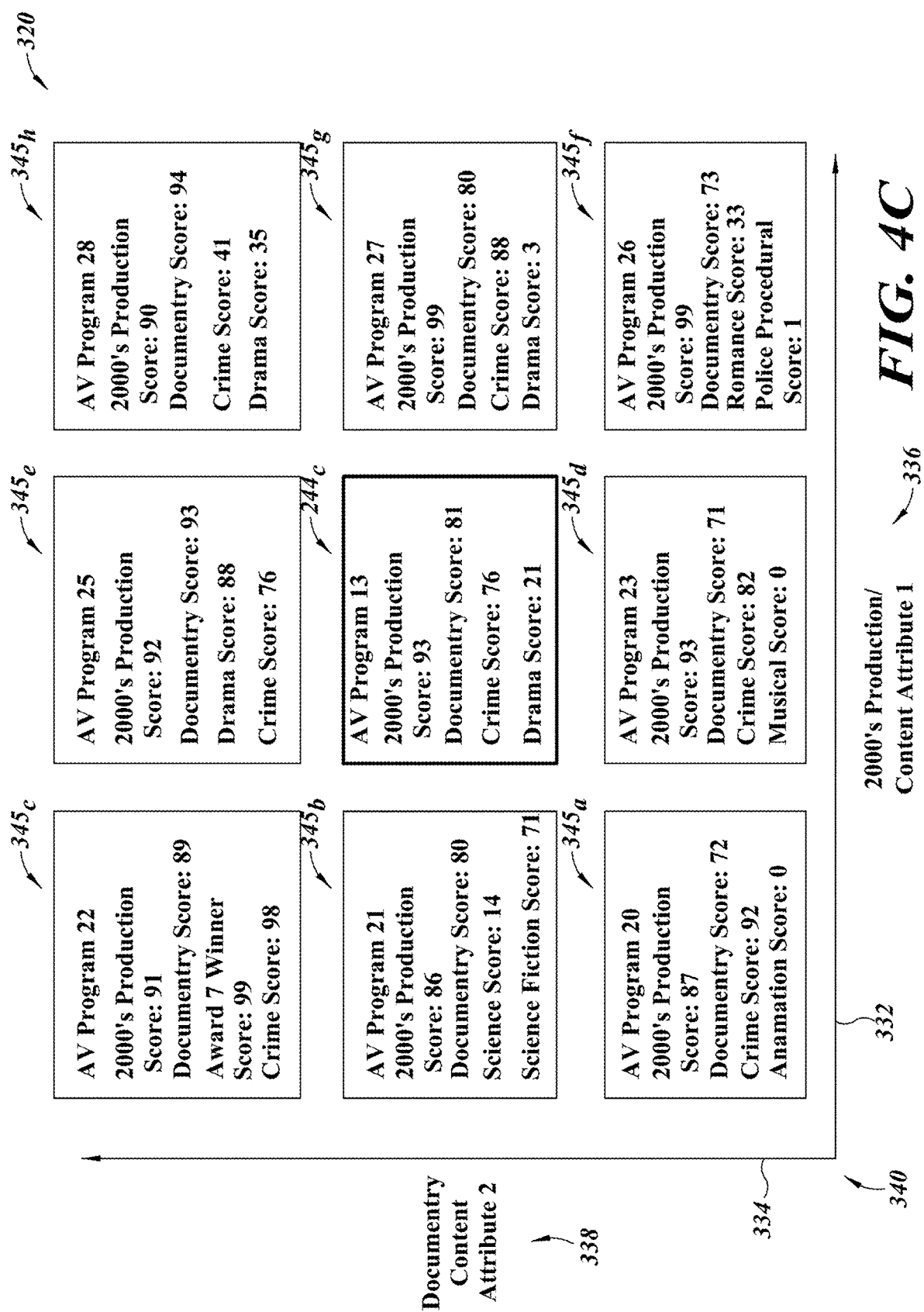

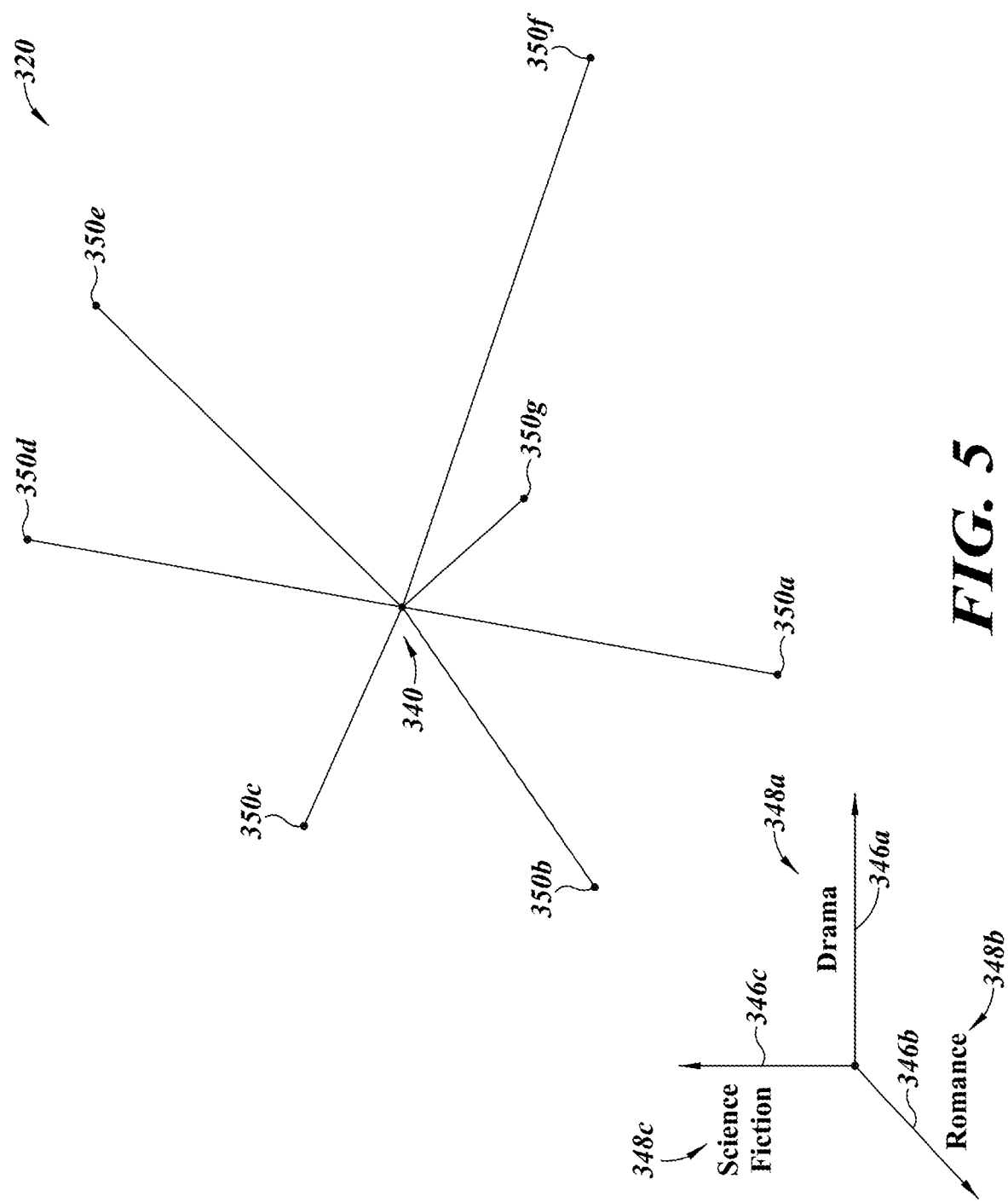

DYNAMIC CONTENT SELECTION MENU

BACKGROUND

Technical Field

This disclosure is related to presenting a menu of audiovisual (AV) content to a user and in particular a content selection menu that facilitates heuristic content searching.

Description of the Related Art

Connected devices and consumer electronics devices, such as set-top boxes and smart televisions, among others, are configured with user interfaces (UIs) that allow users to search for content. For example, content streaming providers and satellite and cable television operators provide various interfaces and menus for a user to search for content and then receive the content on their television displays.

Conventional menus or content searching is based on time of day channels or keyword identifiers, for example, a user searches for a title of the content and receives query results matching the user's search terms. Using keyword searching, a user may only locate content which they set out to identify, along with other incidental query results. Keyword searching may not be suitable for users who seek to explore new content or identify content heuristically or based on their mood. Furthermore, keyword searching does not permit users to identify content based on its similarity to other content known to the users.

Accordingly, it is desirable to have a method and apparatus for providing a content selection menu that enables users to explore content based on a plurality of attributes of the content.

BRIEF SUMMARY

A menu for presenting AV programs to a target user is disclosed. The menu can be displayed on a television or another type of display screen. The menu shows multiple audiovisual (AV) programs for the target user to select. The AV programs may be positioned in the menu in accordance with their rating for a content attribute, such as a particular film genre. For example, the AV programs may be positioned in the menu in increasing order (from bottom to top or from left to right) in accordance with their rating for the drama genre. Accordingly, films that are rated as being slightly dramatic are positioned on the left whereas more dramatic films are positioned on the right.

The menu may be multi-dimensional (for example, two- or three-dimensional). Each dimension of the menu may correspond to a content attribute, such as a genre, and the AV programs may be positioned within an area or a space based on their ratings. For example, if the two dimensions of the menu correspond to the drama and comedy genres, then an AV program positioned on the top right may be rated as being highly dramatic and comedic, whereas another AV program positioned on the bottom left may be rated as being slightly dramatic and comedic.

The menu is advantageous because it facilitates heuristic- or mood-based searching. As opposed to requiring a user to use keywords, such as titles, to search for content, the user may instead be presented with a menu showing a spectrum of programs ordered/positioned according to specified attributes. The user may more easily identify a program to view that best fits his/her mood when the programs are presented according to their attributes.

Instead of selecting a program to watch, a user may indicate interest in a genre or a particular program on the menu and explore similar programs. The user may indicate interest in a program by, for example, pressing a specific remote control button. Based on indicating interest, another menu is generated that includes programs whose attributes are similar to the program of interest. For example, if the program of interest is highly dramatic and highly comedic, the second menu will present programs that are also highly dramatic and highly comedic. The user may select a program to watch from the second menu. Alternatively, the user may select a program of interest and another menu is generated including programs having similar attributes as the program of interest. The process continues until the user has identified a program to watch or finishes exploring programs.

BRIEF DESCRIPTION OF THE SEVERAL VIEWS OF THE DRAWINGS

FIG. 4C shows an example of a content selection menu in accordance with one embodiment.

FIG. 5 shows an example of a three-dimensional content selection menu in accordance with one embodiment.

DETAILED DESCRIPTION

Figure 1:
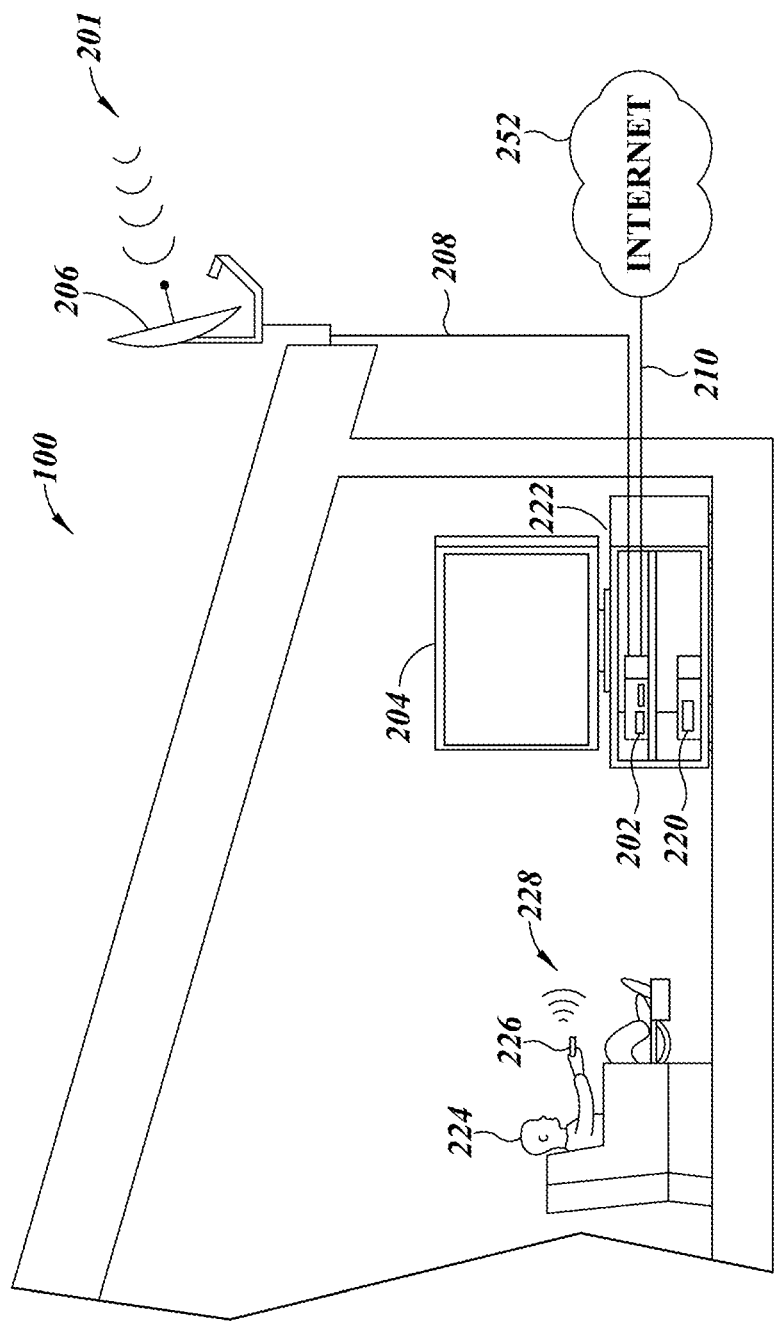
FIG. 1 is a schematic of an exemplary residential media entertainment system.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a content receiver or set-top box supported by the media provider or by a third party maintenance service provider. Such hardware can also include, for example, digital video recorder (DVR) devices and/or digital-video-disc (DVD) recording devices or other accessory devices inside, or separate from, the set-top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the home entertainment system components described herein.

One skilled in the art will recognize that the present disclosure can also apply to other types of systems that offer technical support to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the term content receiver as a broad term that includes a television converter, receiver, set-top box, television receiving device, television receiver, television recording device, satellite set-top box, satellite receiver, cable set-top box, and cable receiver, and content receiver, to refer to electronic equipment that has the capacity to acquire, process and distribute for viewing one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a content receiver. The signals transmitted by these broadcast, cable, telephone, satellite, or other distributors can include, individually or in any combination, Internet, radio, television or telephonic data, and streaming media.

As yet another general matter, it will be understood by one skilled in the art that the term "television" refers to a television set or video display that can contain an integrated television converter device, for example, an internal cable-ready television tuner housed inside a television or, alternatively, connected to an external television converter device such as an external set-top box connected via cabling to a television. A further example of an external television converter device is the EchoStar Hopper combination satellite set-top box and DVR.

In the figures, identical reference numbers identify similar features or elements. The sizes and relative positions of the features in the figures are not necessarily drawn to scale.

Turning now to the drawings, FIG. 1 illustrates an exemplary media subscription service environment that includes a content receiver system 100, according to one embodiment. A basic content receiver system 100 includes a content receiver 202, also called a set-top box in some systems, communicatively coupled to a source of media content, for presentation on a display 204. The media content is provided as a media signal 201.

In the exemplary embodiment shown in FIG. 1, the content receiver system 100 is a home media entertainment system, and the media signal 201 is a satellite signal received by the rooftop-mounted satellite receiving antenna 206. The content receiver 202 receives media content from the satellite receiving antenna 206 via a communication link 208.

While the content receiver 202 is described herein as being connected to a satellite receiving antenna 206, in other embodiments the content receiver 202 can receive media content from other sources. For example, the content receiver 202 can receive media content via an antenna which receives terrestrial broadcast signals. Alternatively, the content receiver 202 can receive media content via the media signal 201 received via a broadband cable subscriber service. Additionally or alternatively, the content receiver 202 can receive media content via the media signal 201 received directly from the Internet 252 via a network communication link 210, using an Internet-based media subscription service. Furthermore, a content provider may provide to the subscriber multiple media signals 201 via satellite (as shown) and/or via the Internet 252, broadband cable and/or Internet, or in any other suitable way.

The content receiver 202 can be coupled to a television, or the content receiver 202 can be in the form of hardware built into a television, wherein the set-top box receives content from the media service provider. Alternatively, the content receiver 202 can be any electronic device that receives media content by accessing the Internet 252; for example, a gaming console, a smart phone, a tablet computer, a laptop computer, or a desktop computer.

The display 204 can be any kind of video display device such as a cathode ray tube display, a liquid crystal display (LCD), a plasma display, a television, a computer monitor, a rear projection screen, a front projection screen, a heads-up display, or any other electronic display device. The display 204 can include audio speakers, or the display 204 can be coupled to separate audio speakers. The term "for display" as used herein generally includes presentation of an audio component as well as a video component of the media signal 201.

The communication links 208 and 210 typically are wired connections such as one or more coaxial cables. One skilled in the art will recognize that other methods and other systems of delivering the media signal 201 to the content receiver 202 may be possible. For example, one or both of the communication links 208 and 210 can be wireless links.

The content receiver 202 optionally further includes one or more peripheral devices 220 such as a media playback device including, but not limited to, a DVD player, a VCR, a stereo, a television, a game console, or a stand-alone DVR device that provides an alternate source of content directly to the display 204 via a wireless or a wired connection 222. Any of the peripheral devices 220 can be subscriber-owned devices, or they can be supplied by the media subscription service.

The remote control 226 can be operated by a user, for example, the subscriber 224, to cause the content receiver 202 to display received content on the display 204. The remote control 226 may also be used by a viewer to display a programming guide and to communicate program selections to the content receiver 202. The remote control 226 is communicatively coupled to the content receiver 202 via a wireless path 228, for example, an infrared (IR) signal. The remote control 226 can be used to send commands to the satellite content receiver 202, including channel selections, display settings, and DVR instructions. The wireless path 228 can use, for example, infrared or UHF transmitters within the remote control 226. One example of an embodiment of the remote control 226 is the EchoStar Technologies Corporation 40.0 Remote Control that includes an IR transmitter and an ultra-high frequency (UHF) transmitter. The remote control 226 may be able to send signals to the other peripheral devices 220 that form part of the content receiver system 100. The content receiver 202 may also be able to send signals to the remote control 226, including, but not limited to, signals to configure the remote control 226 to operate the other peripheral devices in the content receiver system 100. In some embodiments, the remote control 226 has a set of Light Emitting Diodes (LEDs). Some remote controls can include Liquid Crystal Displays (LCDs) or other screens. The remote control 226 can include buttons, dials, or other man-machine interfaces. While the remote control 226 can often be the common means for a user to communicate with the satellite content receiver 202, one skilled in the art will recognize that other means of communicating with the content receiver 202 are available, including, but not limited to, attached keyboards, smart phones, front panel buttons or touch screens.

The satellite receiving antenna 206 receives media content via the media signal 201 from one or more satellite transponders in earth orbit. Each satellite transponder is, for purposes of the content receiver system 100, a source of content that transmits one or more media channels to the satellite receiving antenna 206. A satellite television distributor can transmit one or more satellite television signals to one or more satellites. Satellite television distributors can utilize several satellites to relay the satellite television signals to the subscriber 224. Each satellite can have several transponders. Transponders transmit the satellite signal from the satellite to the satellite receiving antenna 206.

Figure 2:
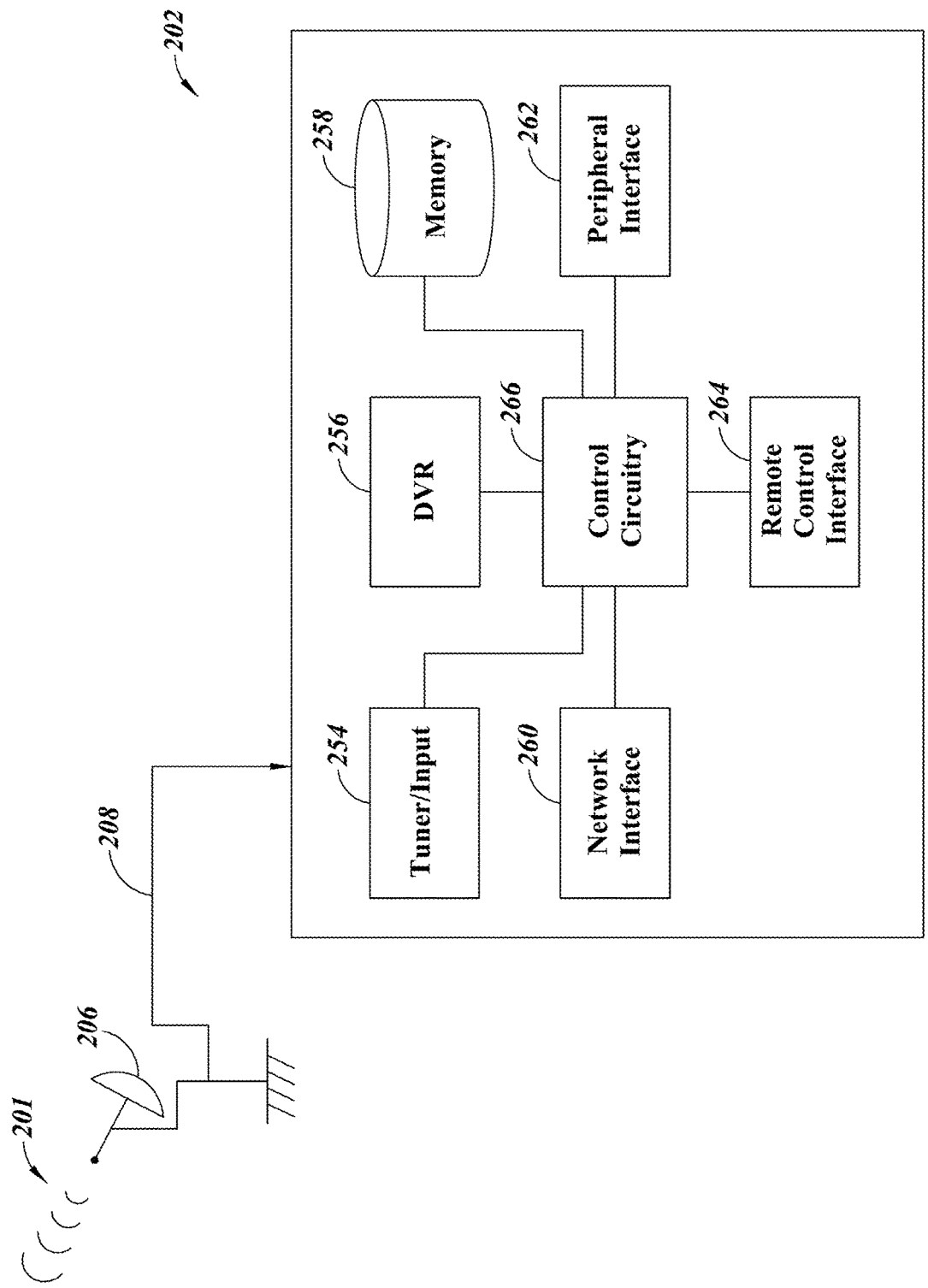
FIG. 2 is a block diagram showing components of a content receiver.

FIG. 2 shows components of the content receiver 202 suitable for use in combination with an embodiment of the present disclosure. Components of the content receiver 202 include control circuitry 266, one or more tuning devices 254, an optional internal digital video recorder (DVR) 256, a non-transitory computer readable memory 258, a network interface 260, a peripheral interface 262, and a remote control interface 264.

Generally, the content receiver 202 can receive one or more television signals from a media provider such as a cable television distributor, a broadcast television distributor or a satellite television distributor. In the embodiment shown, the content receiver system 100 receives signals from a satellite television distributor via the satellite content receiver 202. One skilled in the art will recognize that content receiver 202 can also receive video-digital subscriber line (VDSL), DSL, Internet 252, wireless and other signals from content or video distributors. The satellite content receiver 202 can process television signals and can send the processed signals to peripheral electronic devices, such as the display 204 and the remote control 226. The satellite content receiver 202 also can accept commands from the remote control 226 or other peripheral electronic devices. More detail about the functionality of the satellite content receiver 202 is provided below. One skilled in the art will recognize that many embodiments of the content receiver system 100 are possible and within the scope of this disclosure. Other such embodiments can include, but are not limited to, various combinations or permutations of devices and connections for the delivery, storage, and display of communications, content and other data.

In one embodiment, the content receiver 202 receives media content from the satellite receiving antenna 206. The tuning device 254 tunes into a selected media channel received by the satellite receiving antenna 206 to acquire a satellite signal. The tuning device 254 can initially process the satellite signal. The tuning device 254 can also receive subscriber commands in the form of signals from the control circuitry 266. Signals from the control circuitry 266 can include, but are not limited to, a signal to tune to a transponder as part of the process of selecting a certain channel for viewing on a peripheral device. The tuning device 254 transmits the acquired satellite signal to the control circuitry 266 where the signal can undergo extensive signal processing.

Furthermore, the content receiver 202 can include multiple tuning devices 254. This allows the content receiver 202 to record two or more programs that air simultaneously. Generally, the content receiver 202 can record one show at a single time for each tuning device 254 that the content receiver 202 includes. For example, if the content receiver 202 includes two tuning devices 254, then the content receiver 202 can record two media programs simultaneously. Thus if there is a recording conflict between two programs, the content receiver 202 can still record both programs because it has two tuners. If a recording conflict occurs because the number of tuning devices 254 is less than the number of programs the subscriber 224 wants to view or record, the control circuitry 266 can be programmed to resolve the conflict by prioritizing certain media content according to the subscriber's directions, or automatically, based on various criteria.

The DVR 256 can be used to record programs locally in the content receiver 202. For example, while viewing the programming guide the user may notice a TV show that is not broadcast at a convenient time. By using the remote control 226 the user can command the content receiver 202 to record the TV show to the DVR 256 so that the user may view the TV show at a later convenient time. When the user selects a program to be recorded to the DVR, the content receiver 202 sets a recording timer that causes the content receiver 202 to automatically record the selected program at the scheduled time. At a time convenient to the user, the user can operate the remote control 226 to cause the content receiver 202 to display a list of programs that have been recorded to the DVR. The user can select the desired program from the list of recorded programs and the content receiver 202 will play back the selected program.

The satellite content receiver 202 can be connected to the display 204 and the peripheral devices 220 through a peripheral interface 262. Such peripheral devices can send and receive signals to and from the satellite content receiver 202. For instance, a television can receive video and audio signals, whereas a stereo can receive only audio signals. One skilled in the art will recognize that the peripheral devices can include many types of commercially available electronic devices.

Another peripheral device and connection to the satellite content receiver 202 can include a phone line and modem. Content receiver 202 can use a modem and phone line to communicate with one or more outside entities or systems (e.g., satellite television distributor) using DSL or other protocol.

The remote control interface 264 includes instructions that allow a user to communicate with the satellite content receiver 202, and can be implemented using the peripheral interface 262 or by connecting a separate remote control interface device. The remote control interface 264 can translate an input from the user into a format understandable by the control circuitry 266. The remote control interface 264 can thus be considered a user interface (UI). The translation systems can include, but are not limited to, electronic receivers and electronic relays. The remote control interface 264 can receive commands from more than one remote control 226. The remote control 226 can use infrared, UHF, or other communications technology. One skilled in the art will recognize that other means to receive and translate user inputs are possible.

Figure 3:
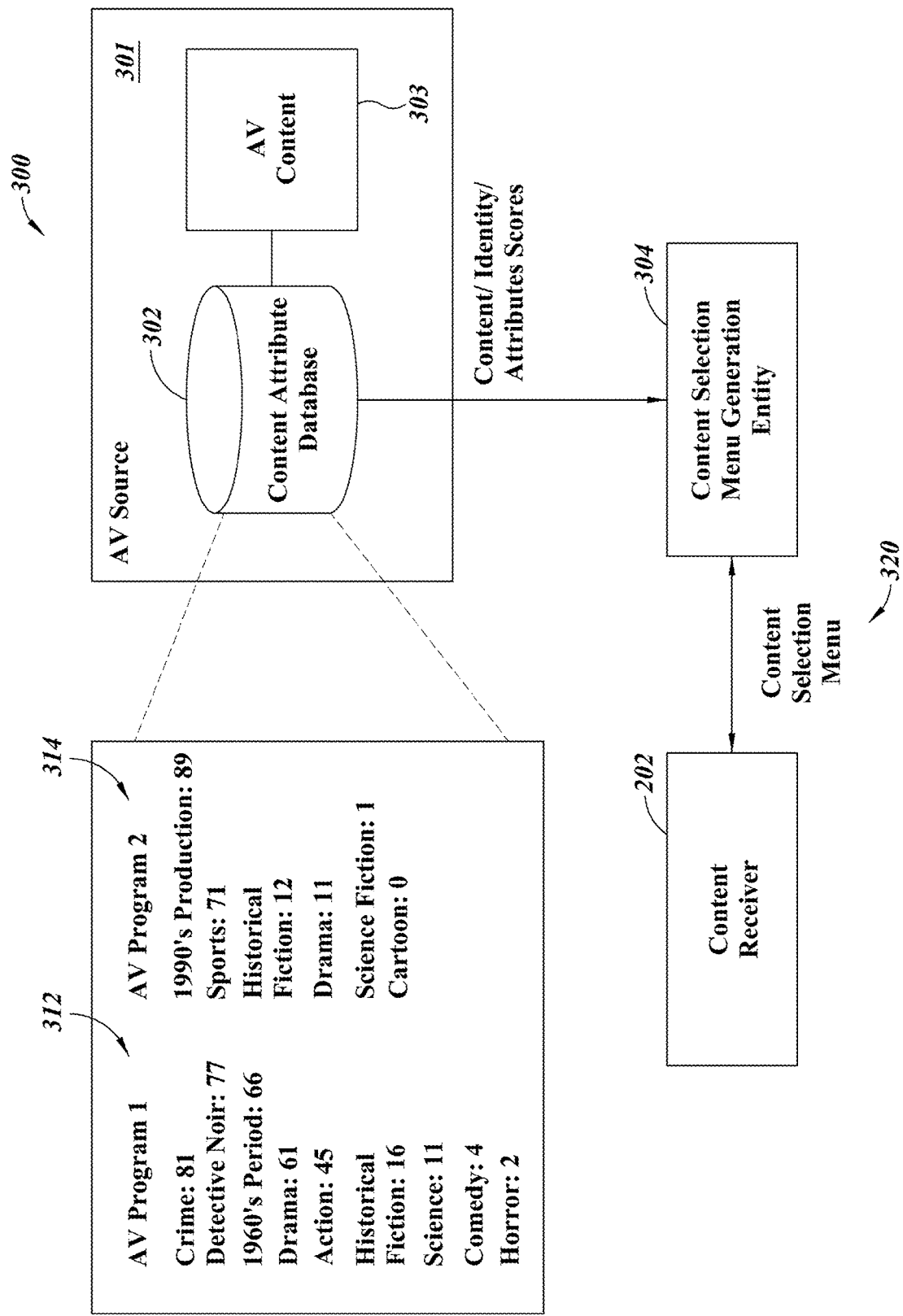
FIG. 3 is an example of an environment for content selection menu generation in accordance with one embodiment.

FIG. 3 is an example of an environment 300 for generating a content selection menu in accordance with at least one embodiment. The environment 300 includes an AV source 301, a content selection menu generation entity 304 and a content receiver 202. The AV source 301 includes both a content attribute database 302 and a source for AV content 303. As shown in FIG. 3, the AV source 301, the content selection menu generation entity 304 and the content receiver 202 are communicatively coupled to permit the content selection menu generation entity 304 to have access to the AV source 301 or the content attribute database 302 thereof. The content selection menu generation entity 304 is able to retrieve data from the content attribute database 302. Further, the content selection menu generation entity 304 may transmit and receive data from the content receiver 202.

The content attribute database 302 may be any type of storage system that stores an identity associated with content as well as one or more attributes of the content. Furthermore, for each content attribute, the content attribute database 302 will also store an associated score that represents a degree of association between the content and the attribute or a level of correspondence between the content and the attribute. The score may be a value that represents a numeric score. In various embodiments, however, the score may be a letter grade, among others.

The content attribute database 302 may be any type of system capable of storing data. For example, the content attribute database 302 may be a database server, a hard disk or hard drive, among others. Furthermore, the content attribute database 302 may be local in relation to the content selection menu generation entity 304 or the content receiver 202 or may be remotely accessible via a network, such as the Internet or an intranet.

In one embodiment, the AV content 303 and the attributes are stored together in the same database. Normally, each AV program has associated with itself the attributes of that program. Thus, a single source can provide both the AV program that is the content as well as the attributes. For example, when searching just for the attributes, that part of each AV program which contains the attributes is received and not the entire program content. The attributes may be metadata of the AV content 303. For example, if the AV content 303 is a multimedia file, the metadata may be stored as part of the metadata file or in a different file.

In various embodiments, the AV content 303 and the content attributes database 302 are not independent entities and one entity may store the content attributes and the AV content 303. Furthermore, the content attributes may be stored in and retrieved from an entity that is not dedicated solely dedicated for their storage. Instead the entity may be used to store and provide the content as well as its attributes. For example, the AV source 301 of FIG. 3 may include only one entity that is configured to provide both the AV content 303 and its associated attributes.

As described herein, content may be any type of media, such as audio, video or audiovisual media. In various embodiments, the content may be an image or text. Further, the content may be broadcast live or prerecorded. For example, the content may be a live sport or political event, a movie, a television series, a song or a radio program, among others. The content may be identified in the content attribute database 302 by a content identifier. The content identifier may be an alphanumeric, binary or hexadecimal identifier, among others. The content identifier may be used to uniquely identify and distinguish the content from other content, such as other audiovisual (AV) programs, whereby the content identifier may be a title of the AV program.

The content attribute database 302 may store the content identifier as well as one or more content attributes associated with the content. A content attribute may be any type of classification or category associated with the content. A content attribute may be a genre to which the content is classified as belonging. The genre may be action, military fiction, spy fiction, western fiction, adventure, comedy, parody, humorous, romantic comedy, crime, courtroom drama, detective story, legal thriller, fantasy, fables, epic fantasy, mythic fiction, science fantasy, historical, biographical, historical fiction, period piece, horror, mystery, paranormal, political, romance, saga, science fiction, war, psychological thriller or crime thriller, among others.

Furthermore, in the event that the content is television program, movie or song, the content attribute may be a period or a decade in which the content was produced. For example, a content attribute may be 1980s, 1990s or 2000s. The content attribute may also be a period or a decade in which the depicted events of the AV program take place. For example, a movie may be produced in 1990s depicting events in the 1860s. There are thus two date attributes, the date of production and the date that is the subject of the AV content 303. A period attribute may be 1860, 1920s, 1930s or 1940s, among others. In various embodiments, the content attribute may be a writer, producer, director or actor of an AV program. The content attribute may also be an award that the AV program won.

The content attribute database 302 may store the content identifier together with one or more attributes associated with the content (or identifiers thereof). Furthermore, each content attribute may be scored (or rated) to reflect a degree or level of association of the content to the content attribute. The rating may be a numeric rating or alphabetical rating, among others.

Referring to content as an AV program, a first AV program 312 shown in FIG. 3 has a drama score of 61, whereas a second AV program 314 has a drama score of 11. Accordingly, due to its higher rating for drama, the first AV program 312 is more closely associated with the drama genre than the second AV program 314. An AV program 312, 314 may be scored with respect to a content attribute anywhere in a scoring range and between a maximum score and a minimum score. For example, the scoring range may be between 0 and 100, where a score of 0 indicates no association with the content attribute and a score of 100 indicates maximum association with the content attribute. Alternatively, the AV program 312, 314 may be scored for each content attribute such that the sum of all the scores results in a pre-specified value, such as 100. Accordingly, an AV program 312, 314 that is mostly dramatic and slightly comedic and is not associated with other content attributes may have scores of 80 for drama and 20 for comedy.

Scoring the AV programs 312, 314 may be based on user feedback. For example, the first AV program 312 may have received a higher drama rating than the second AV program 314 due to the fact that more users rated the first AV program 312 as belonging to the drama genre than the second AV program 314. Users that view an AV program 312, 314 may be asked to rate the program for various genres (for example, by providing a score for the genre or selecting a number of starts from a maximum number of stars). The ratings of one or more users are then compiled and aggregated to determine the score associated with an AV program 312, 314 for each attribute. Further, a content provider, such as a satellite television or cable provider may rate the content for various genres. In addition, the content producer, such as a movie studio, or distributor may provide various scores for the content attributes. The scores for each content attribute provided by a number of sources may be aggregated to determine the content's score for each attributes.

The content selection menu generation entity 304 may be any type of computer system configured to generate a content selection menu. The content selection menu generation entity 304 may be a server or a host computer equipped with computing functionality. For example, the server may include one or more central processing units (CPUs) that provide the computing functionality. Further, the selection menu generation entity 304 may be equipped with storage and networking capability.

The content selection menu generation entity 304 may generate the content selection menu based at least in part on received information from the content attribute database 302. The information may include a plurality of content identities that are to be evaluated for inclusion in the content selection menu. Further, for each identity of the plurality of identities, the content selection menu generation entity 304 receives one or more associated content attributes as well as a score pertaining to each content attribute of the one or more content attributes.

As described herein, the content selection menu may be a multidimensional menu having a plurality of axes. Each axis of the plurality of axes may correspond to a content attribute that is different than the content attribute of another axis of the plurality of axes. An AV program may be positioned within the content selection menu and relative to each axis in accordance with the AV program's score pertaining to the content attribute denoted on the axis.

The content selection menu generation entity 304 may generate a content selection menu 320 and may provide the content selection menu 320 to the content receiver 202. The content receiver 202 may cause the content selection menu 320 to be rendered on a display device (such as a television screen) for user selection. It is noted that, in various embodiments, the content selection menu generation entity 304 may be local to the content receiver 202, whereby the content selection menu generation entity 304 may be part of the content receiver 202. Alternatively, the content selection menu generation entity 304 may be remote in relation to the content receiver 202 and accessible over a communication network. If the content selection menu generation entity 304 is remote in relation to the content receiver 202, the content selection menu 320 may be transmitted to the content receiver over the communication network and user selection described herein may be transmitted back from the content receiver 202 over the network.

Figure 4A:
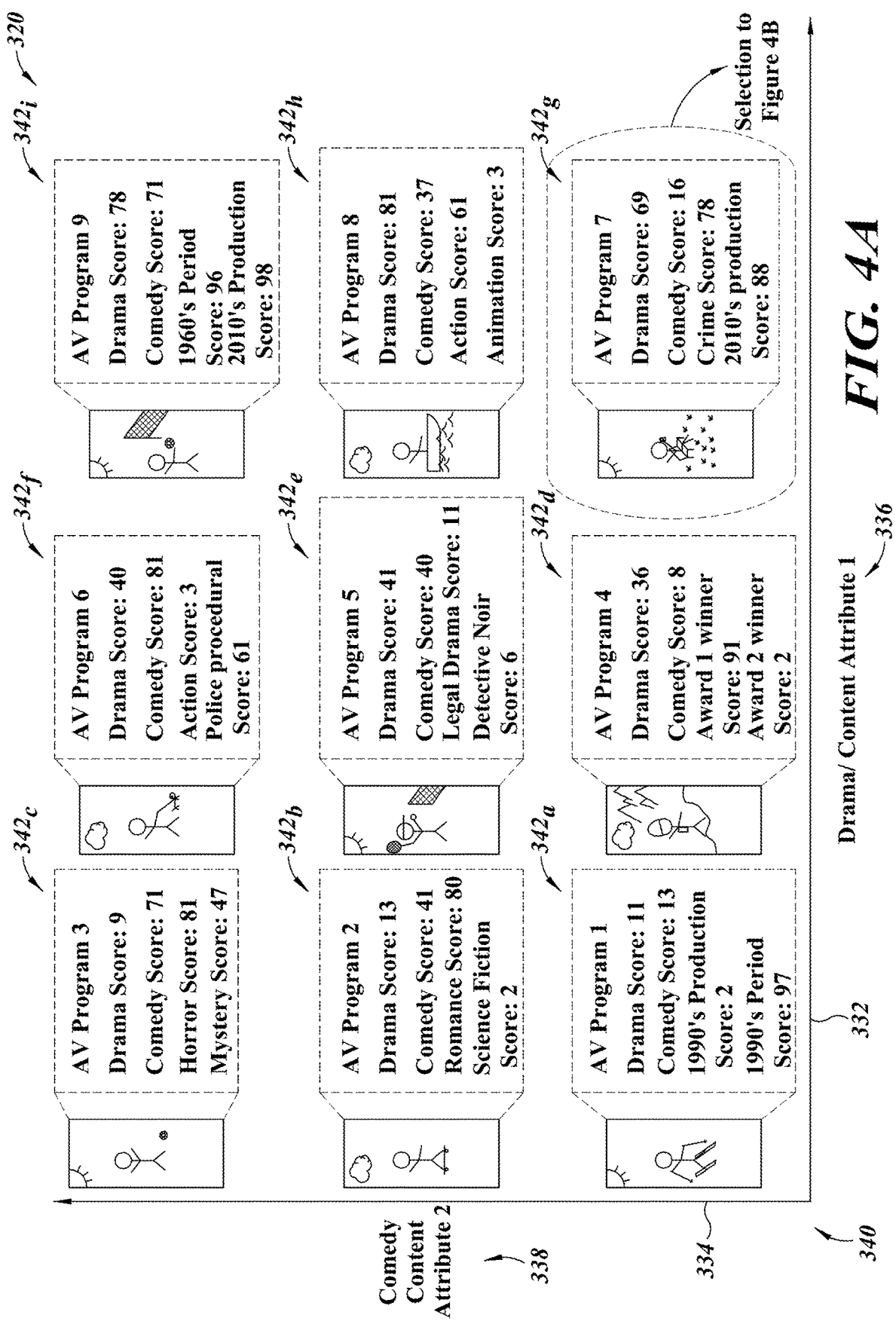
FIG. 4A shows an example of a content selection menu in accordance with one embodiment.

FIG. 4A shows an example of a content selection menu 320 in accordance with at least one embodiment. The content selection menu 320 has a horizontal axis 332 and a vertical axis 334. The horizontal axis 332 is associated with a first content attribute 336 and the vertical axis 334 is associated with a second content attribute 338. In FIG. 4A, the first content attribute 336 is shown to be the drama genre and the second content attribute 338 is shown to be the comedy genre. As described herein, an AV program may be positioned in the content selection menu 320 relative to the drama axis or the comedy axis in accordance with the AV program's score pertaining to the drama or comedy genre, respectively. Further, when presenting the content selection menu 320 each axis 332, 334 may be labeled with its respective content attribute.

A plurality of AV programs 342a-342i (collectively herein referred to as 342) may be provided for selection using the content selection menu 320. As shown in FIG. 4A, previews or images of the AV programs 342 are shown in the content selection menu 320 for identifying the respective AV programs 342. The shown images may be captions from a movie that serve to identify the movie to users. Furthermore, the previews that are shown may be several minutes in length and may be continually played while the menu 320 is presented. If the menu 320 is presented for a longer duration of time than the length of the preview, the preview may be repeatedly played or interleaved with movie captions or identifying information, such as title, actor/actress information, director or producer, among others. Because the content selection menu is two-dimensional having the first axis 332 and the second axis 334, the plurality of AV content 342 may be disposed in a plane defined by the two axes 332, 334. The positioning of an AV program 342 along each axis of the plane may be based on and reflective of the AV program's 342 score for the attribute pertaining to the axis. For example, the first AV program 342a is closer to an origin point 340 along the first axis 332 than the seventh AV program 342g because the first AV program 342a has a lower drama score (score of 11) than the seventh AV program 342g, which has a drama score of 69. Similarly, the third AV program 342c is farther from the origin point 340 along the second axis 334 than the first AV program 342a because the third AV program 342c has a higher comedy score (score of 71) than the first AV program 342a, which has a comedy of 13.

As shown in FIG. 4A, each of the plurality of AV programs 342 are also associated with a number of other content attributes and have scores for each attribute with which they are associated. The plurality of AV programs 342 may each be associated with varying content attributes and have different scores for those attributes.

An axis of the content selection menu 320 serves as a reference for the score of an AV program associated with the content attribute of the axis. The positioning of an AV program 342 with respect to the axis reflects the score of the AV content 342 for the content attribute associated with the axis. By spatially positioning an AV program 342 in relation to its associated scores for various content attributes, searching for content becomes more intuitive.

When rendering the content selection menu 320 on a display device, such as a smart television, each AV program 342 that is part of the content selection menu 320 may be presented to a viewer by a brief preview segment. For example, when rendering the content selection menu 320 of FIG. 4A, each AV program 342 in the menu may be represented by a window including a short a preview of the AV program 342. The user can click on the program for a preview if they wish. The window may be a region or an area of the display. For example, the window may have a square or a rectangular boundary or another boundary in accordance with another aspect ratio.

As an alternative to the preview, the title of the AV program 342 may be shown along with other data associated with the AV program, such as a director or an actor starring in the AV program. In various embodiments, if the AV program is live broadcast on a television channel, the broadcast may be shown in the content selection menu 320.

In addition to previewing the video portion of an AV program, the audio portion may also be previewed. When a menu 320 comprises a plurality of AV programs, the video portions of the programs may be previewed simultaneously. However, it may be advantageous that only one audio portion be previewed at any one point in time because the crosstalk generated from previewing more than one audio portion may be bothersome to some users. Selecting an AV program for audio previewing may be based on user input, whereby the user may select or navigate using a pointer to an AV program. Absent user input (for example, when the menu 320 is initially provided to a user) a default AV program of the menu may be chosen (for example, randomly or based on its positioning in the menu) for audio preview.

When a menu 320 of the plurality of AV programs 342 is provided to a user, the user may provide a selection input of an AV program of the plurality of AV programs 342. The selection input may indicate that the user seeks to watch the selected AV program. The selection input may be indicated using a specified button on a remote control or other input device, among others. When a user provides the selection input, the content selection menu 320 is no longer displayed and the AV program is then played on the display device of the user.

Alternatively, the user may select an AV program 342 to preview more extensively than permissible through the menu 320. Accordingly, the window showing the AV program 342 may be enlarged and the video and/or audio of the AV program may be played for the user to preview. Following completing the preview, the user may return to the content selection menu 320, whereupon the user may preview another AV program or indicate a selection input of an AV program from the content selection menu 320 for watching.

The user may alternatively opt to continue searching for AV programs 342 or explore other AV programs using the content selection menu 320. The user may provide an interest input of an AV program 342 provided by the content selection menu 320 (for example, by pressing a specified button on a remote control or using another type of input device). The interest input may indicate that the user seeks to explore more AV programs 342 similar to the indicated interest. The content selection menu 320 will facilitate intuitive searching of AV programs. The content selection menu 320 will facilitate heuristic and mood-based content exploration and searching, whereby the user will be guided to find AV programs 342 similar to one that the user knows or has previously watched. By experimenting and trial-and-error, the user may utilize the content selection menu 320 to navigate to AV programs 342 that fit his or her mood. With the content selection menu 320, searching for AV programs becomes a way of further investigating available AV program 342 other than a discrete or keyword-based search.

For example, using a remote control the user may show an interest in an AV program 342 by navigating to the AV program and pressing a specific remote control button to indicate that a further AV program search is sought of programs of the same type. Alternatively, hand gesture recognition may be used for identifying the AV program of interest.

Based on the interest input a subsequent content selection menu 320 is provided. The subsequent content selection menu may include AV programs 342 that are identified based on the content attributes of the AV program of interest. As shown in FIG. 4A, the user provided an interest input for the seventh AV program 342g. As a result, the content selection menu generation entity described herein will generate a further content selection menu 320 described with reference to FIG. 4B. The further content selection menu 320 will be generated based on the seventh AV program 342g or the content attributes associated with the program 342g.

Figure 4B:
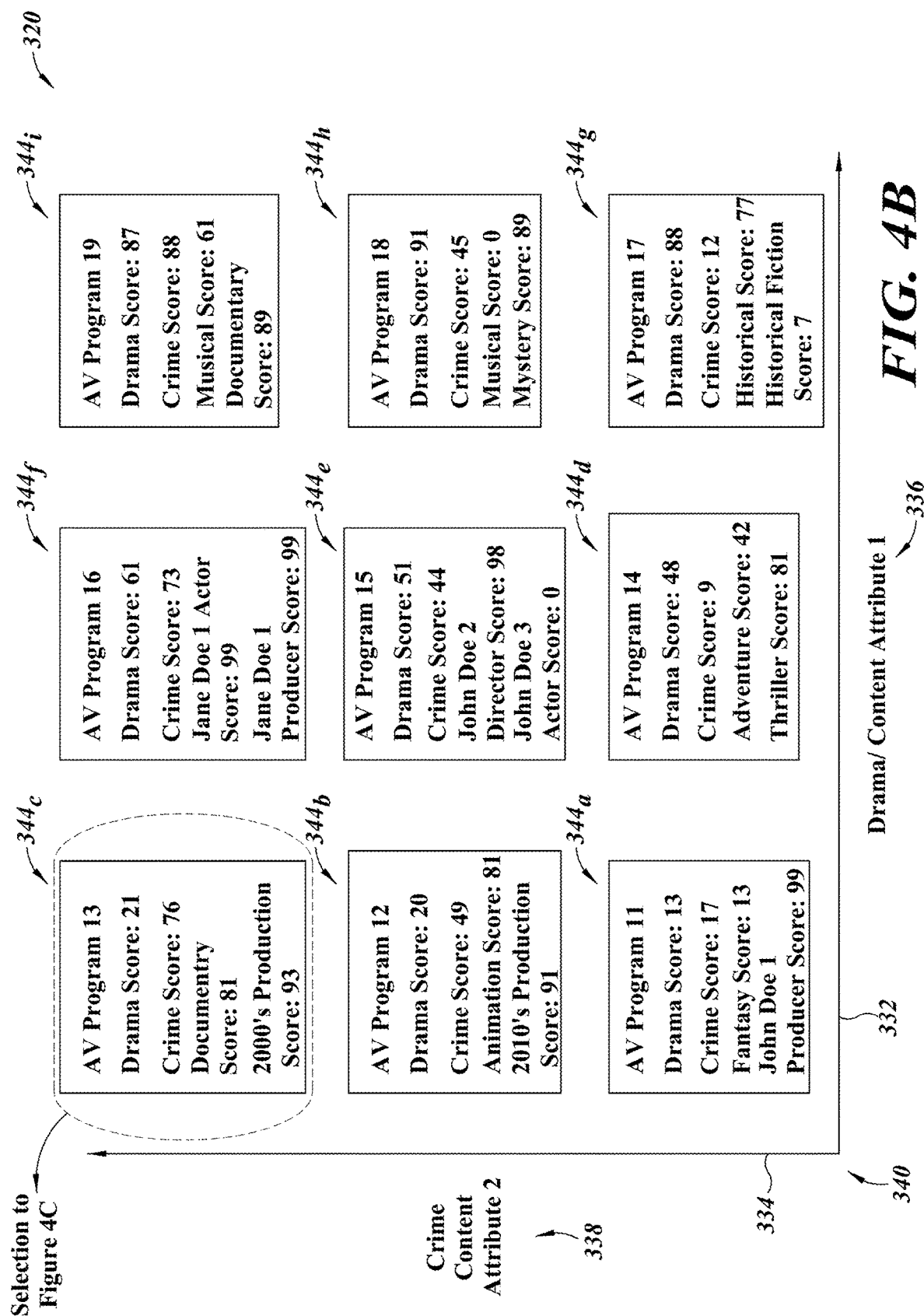
FIG. 4B shows an example of a content selection menu in accordance with one embodiment.

Similar to the prior generation of the content selection menu 320, two or more content attributes are identified for program 342g (usually the top two or three attribute scores) and each content attribute is linked to an axis of the content selection menu 320. The content attributes 336, 338 corresponding to the axes of the content selection menu 320 of FIG. 4B are determined based on the attributes of the AV program 342g of the interest input. In the example of FIG. 4A, because the seventh AV program 342g has a relatively high score for the drama attribute, the drama attribute may be used as an axis of the content selection menu 320. The other axis of the content selection menu may correspond to another content attribute for which the selected AV program has a relatively high score. Because the seventh AV program 342g has a relatively high score has a relatively high score for the crime genre, the crime genre is selected as the content attribute of the second axis of the content selection menu 320. In various embodiments, the plurality of content attributes of a content selection menu may be those content attributes for which the AV program of the interest input has the highest scores.

Similar to the content selection menu 320 described with reference to FIG. 4A, the content selection menu 320 of FIG. 4B includes a second plurality of AV programs 344a-344i (collectively referred herein as 344). Each AV program of the second plurality of AV programs 344 is positioned in a plane defined by the first and second axes 332, 334. The position along each axis is determined based on the AV program's associated score for the content attribute of the axis as described herein.

The second plurality of AV programs 344 may be different than the plurality of AV programs 344 or there may be some AV programs that are included in both menus. The AV program 342g indicated by the interest input may be excluded from the content selection menu of FIG. 4B due to the fact that the user was presented with the option of viewing the selected AV program but opted to search for other similar AV programs instead. Alternatively, and as described herein, the AV program 342g indicated by the interest input may be presented as part of a subsequent content selection menu.

Similar to the first content selection menu 320, the user provide a selection input and select an AV program to preview or watch. Alternatively, the user may provide an interest input to choose a program that is closest to that which they seek to view and a new content selection menu may be presented including a further plurality of AV programs. If an AV program is selected for generating another content selection menu, the content attributes of the AV program, as well as the content attributes of the previously selected AV program, may be used to determine the content attributes of the axes of the menu. For example, the attributes of the selected programs may be correlated to identify the attributes of the axes of the newly generated menu. A history of user selections may be stored and utilized for determining the content attributes of programs the user seeks to watch. These content attributes are then used for presenting further content selection menus. The history of user selections may be stored for one session of content browsing and selection or over multiple sessions of the user over a period of time.

As shown in FIG. 4B, the user provides an indication of interest in the third AV program 344c. The content selection menu 320 shown in FIG. 4C is generated based at least in part on the received indication of interest in the third AV program 344c. Because the third AV program 344c of the second plurality of AV programs 344 has relatively high scores for the documentary genre attribute and the 2000s production attribute, the documentary genre attribute and the 2000s production attribute are used as axes 332, 334 attributes.

In addition, a third plurality of AV programs 345a-345h (collectively referred herein as 345) are identified. The third plurality of AV programs 345 have certain features in common. The third plurality of AV programs 345 have scores for the documentary genre attribute and the 2000s production attribute that are commensurate with the scores of the third AV program 344c program of interest. The scores of the third plurality of AV programs 345 for the documentary genre attribute and the 2000s production attribute may be within predetermined ranges of those of the third AV program 344c of interest. The third plurality of AV programs 345 are selected such that they have both higher scores for each content attribute and lower scores for each content attribute than the program of interest 344c.

As shown in FIG. 4C, the third AV program 344c of interest is part of the content selection menu 320. Disposed around the third AV program 344c are a third plurality of AV programs 345 that also have relatively high scores for the documentary genre attribute and the 2000s production attribute. The location of a third AV program of the third plurality of AV programs 345 is a function of the program's scores for the documentary genre attribute and the 2000s production attribute. For example, the first AV program 345a of the menu 320 (listed as "AV program 21") has the lowest scores for both the documentary genre attribute and the 2000s production attribute. Accordingly, the first AV program 345a is positioned closest to the origin point 340 of the menu 320 than the other programs.

The selection of the third plurality of AV programs 345 also accounts for historical user interest. Because the AV program of the first interest input (described with reference to FIG. 4A) had a relatively high score (score of 78) for the crime genre attribute, some of the third plurality of AV programs 345 also have high scores for the crime genre attribute. As shown in FIG. 4C, AV programs 345c, d, e, g have high scores for the crime attribute. As the user continues to provide interest input, patterns of user interest are identified. Also, content selection menus are generated based on historical user interest.

FIG. 5 shows an example of a three-dimensional content selection menu in accordance with at least one embodiment. The content selection menu 320 has three axes 346a-346c (collectively referred to herein as 346). Each axis 346 is associated with a corresponding content attribute, whereby the first axis 346a is associated with a first content attribute 348a that is the drama genre, the second axis 346b is associated with a second content attribute 348b that is the romance genre and the third axis 346c is associated with a third content attribute 348a that is the science fiction genre.

A plurality of AV programs 350a-350g (collectively referred to as 350) are positioned in a volume defined by the three axes 346. The positioning of each AV program 350 with respect to a point of origin 340 defining the center of the axes 346 is a function of the rating of the program for the content attribute corresponding to each axis. For example, the AV program referenced by the numeral 350f has a high rating for drama but low ratings for both romance and science fiction. Conversely, the AV program referenced by the numeral 350d has a high rating for science fiction but low ratings for both drama and romance.

Figure 6:
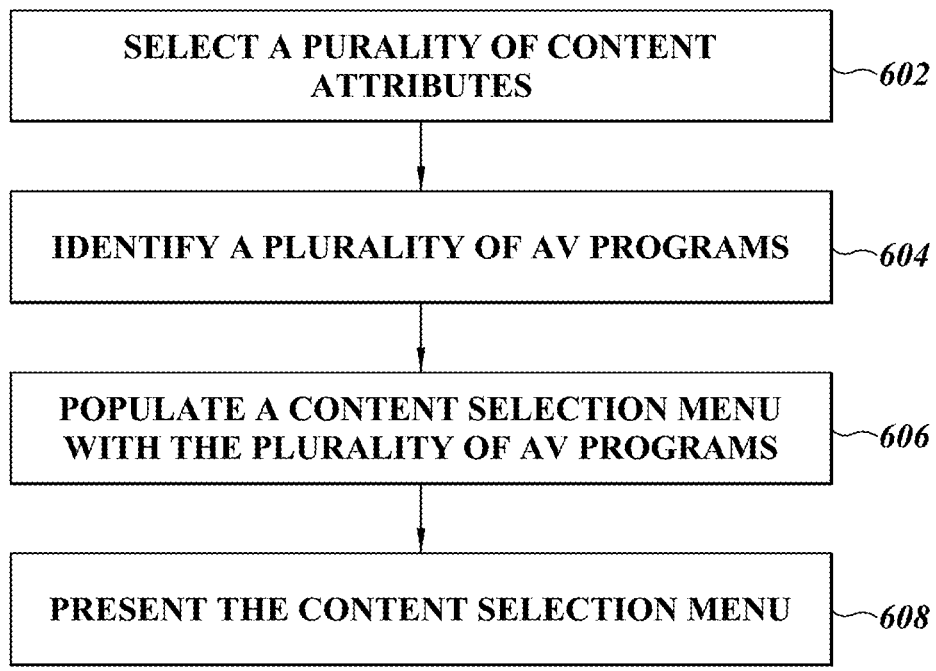
FIG. 6 shows a flow diagram of a method for generating a content selection menu in accordance with one embodiment.

FIG. 6 shows a flow diagram of a method for generating a content selection menu in accordance with at least one embodiment. In the method, a content selection menu generation entity, such as the content selection menu generation entity 304 described with reference to FIG. 3, selects 602 a plurality of content attributes. The plurality of content attributes may be selected for use as axes of a content selection menu. The plurality of content attributes may be selected randomly. For example, if the content selection menu is to be presented to a user absent any user input, the plurality of content attributes may be randomly chosen for use in generating the content selection menu. Alternatively, the plurality of content attributes may be configured by a user. For example, the user may specify two or more content attributes (such as the action and comedy genres) to be used in presenting the content selection menu. Further, absent user input, the most popular user-configured content attributes may be selected for generating the content selection menu.

The content selection menu generation entity then identifies 604 a plurality of AV programs for inclusion in the content selection menu. As described herein, each AV program may be associated with a score indicating the rating of the AV program as it relates to a content attribute. The AV programs may be identified such that a wide selection of AV programs is presented. For each selected content attribute, AV programs having low, moderate and high score for the content attribute may be selected. For example, the range of scores associated with a content attribute may be segmented into three segments such that scores between 0 and 32 are deemed low, scores between 33 and 66 are deemed moderate and scores between 67 and 100 are deemed high. If a 3×3 menu including nine AV programs is sought to be presented, then the menu may be include an AV program for each combination of score segments for the content attributes. The menu may be populated with a first AV program having low scores for both content attributes, a second AV program having a low score for a first content attribute and a moderate score for a second content attribute, a third AV program having a low score for a first content attribute and a high score for a second content attribute and so on.

The content selection menu generation entity then populates 606 the content selection menu with the plurality of AV programs. Populating the content selection menu may include positioning the AV programs (or an identifier thereof, such as a preview or a title of the AV programs) in a multidimensional space. As described herein, the multidimensional space has axes that correspond to the selected content attributes and an AV program is positioned along the axes in accordance with its respective scores. The content selection menu generation entity or another entity, such as a content receiver, then outputs 608 the content selection menu. It is noted that in various embodiments, the content selection menu generation entity is part of the content receiver and the content receiver both generates the content selection menu and sends the content selection menu for display on a display device. As described herein, outputting the content selecting menu may include rending the content selection menu for viewing on a display device, such as a television screen.

Figure 7:
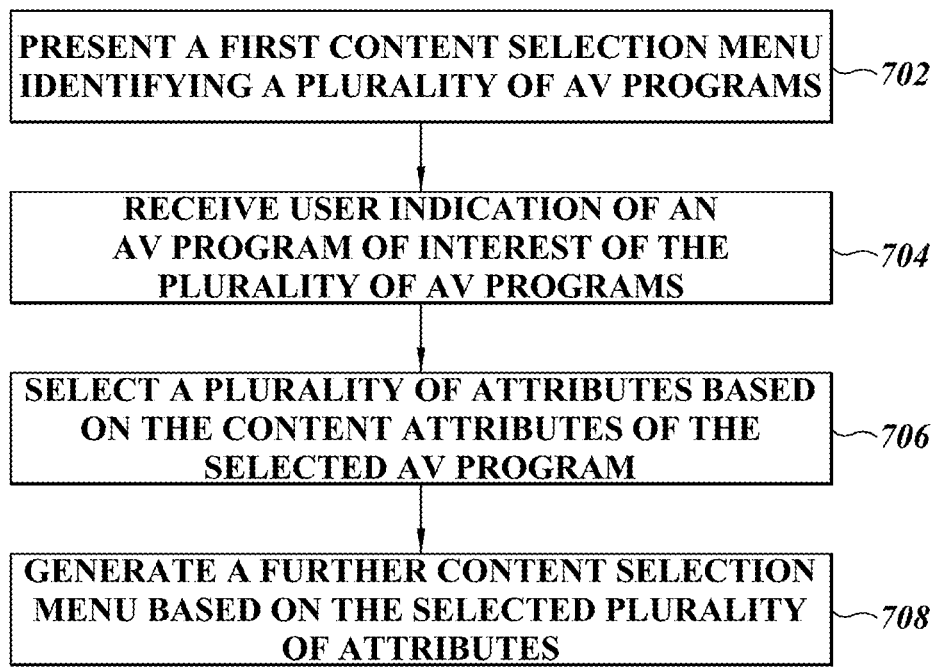
FIG. 7 shows a flow diagram of a method for generating a content selection menu in accordance with one embodiment.

FIG. 7 shows a flow diagram of a method for generating a content selection menu in accordance with at least one embodiment. In the method, an entity, such as the content receiver described with reference to numeral 202 or the content selection menu generation entity described with reference to numeral 304, outputs 702 a first content selection menu identifying a plurality of AV programs. The entity then receives 704 an indication of an AV program of interest of the plurality of AV programs. The entity then selects 706 a plurality of content attributes based on the content attributes of the AV program of interest. The entity then generates 708 a second content selection menu based on the selected plurality of attributes. The second content selection menu may then be outputted. A user may select content to view or may indicate interest in content for generation of further content selection menus.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating a multi-dimensional content selection menu comprising:
   obtaining a first set of a plurality of content attributes specific to a target user;
   assigning each content attribute of the first set to a respective axis of a plurality of axes of the content selection menu;
   identifying a plurality of audiovisual (AV) programs, each AV program having an associated value for each content attribute of the first set;
   determining, for each AV program, a position along each axis of the plurality of axes based on the value for the content attribute corresponding to the respective axis for that attribute;
   populating the content selection menu with the plurality of AV programs by positioning each AV program in a multidimensional space defined by the plurality of axes in accordance with the determined position along each axis of the plurality of axes;
   outputting the content selection menu for presentation;
   receiving an interest input of an AV program from the target user indicating an interest level in one of the plurality of AV programs;
   obtaining a second set of a second plurality of content attributes based on the interest input, wherein the obtaining the second set of the second plurality of content attributes based on the interest input includes:
      determining a plurality of content attributes of the AV program of the interest input;
      for each content attribute of the plurality of content attributes of the AV program of the interest input, determining an associated score of the AV program of the interest input that represents a degree of association between the AV program of the interest input and the content attribute; and
      selecting the second set of the second plurality of content attributes to include content attributes for which the AV program of the interest input has the highest two determined associated scores, which causes the second set of the second plurality of content attributes to differ from the first set of the plurality of content attributes;
   associating each second content attribute of the second set with a second axis of the plurality of second axes of a second content selection menu, which causes the plurality of second axes of the second content selection menu to be associated with different content attributes than the plurality of axes of the content selection menu;
   identifying a plurality of second AV programs different from the plurality of AV programs, each second AV program having an associated second value for each second content attribute;
   determining, for each second AV program, a second position along each second axis of the plurality of second axes based on the second value for the second content attribute corresponding to the respective second axis for that attribute;
   populating the second content selection menu with the plurality of second AV programs by positioning each second AV program in a space defined by the plurality of second axes in accordance with the determined second position; and
   outputting the second content selection menu for presentation.

2. The method of claim 1, further comprising:
   receiving a selection input of a second AV program of the plurality of second AV programs; and
   providing the selected second AV program for play in response to receiving the selection input.

3. The method of claim 1, wherein a first AV program of the plurality of AV programs is displayed at a different position on the presented menu than a second AV program of the plurality of AV programs.

4. The method of claim 1 wherein outputting the content selection menu further includes:
   outputting a preview of at least one AV program of the plurality of AV programs.

5. The method of claim 1 wherein an AV program of the plurality of AV programs is a live broadcast and is provided for viewing as part of the content selection menu.

6. The method of claim 1 wherein the value represents a level of association between the AV program and the content attribute of the plurality of content attributes.

7. The method of claim 1 wherein the plurality of axes are two axes or three axes.

8. A method for generating a multidimensional content selection menu, the method comprising:
   determining a number of dimensions of the content selection menu;
   associating each dimension with a content attribute of a first set of a plurality of content attributes;
   selecting a plurality of AV programs, an AV program of the plurality of AV programs is selected based at least in part on a score of the AV program associated with at least one content attribute of the plurality of content attributes;
   positioning the plurality of AV programs in the content selection menu;
   outputting the content selection menu for display;
   receiving interest input of an AV program of the plurality of AV programs from a target user;
   generating a second content selection menu based at least in part on the interest input wherein the generating the second content selection menu includes:
      obtaining a second set of a second plurality of content attributes based on the interest input, wherein the obtaining the second set of a second plurality of content attributes based on the interest input includes:
         determining a plurality of content attributes of the AV program of the interest input;
         for each content attribute of the plurality of content attributes of the AV program of the interest input, determining an associated score of the AV program of the interest input that represents a degree of association between the AV program of the interest input and the content attribute; and selecting the second set of the second plurality of content attributes to include content attributes for which the AV program of the interest input has the highest two determined associated scores, which causes the second set of the second plurality of content attributes to differ from the first set of the plurality of content attributes;

associating each second content attribute of the second set with an axis of a plurality of axes of the second content selection menu, which causes the plurality of axes of the second content selection menu to be associated with different content attributes than a plurality of axes of the content selection menu;

identifying a plurality of second AV programs different from the plurality of AV programs, each second AV program having an associated score for each second content attribute;

determining, for each second AV program, a position along each axis of the plurality of axes of the second content selection menu based on the score of the second AV program for the second content attribute corresponding to the respective axis of the second content selection menu for that attribute; and populating the second content selection menu with the plurality of second AV programs by positioning each second AV program in a space defined by the plurality of axes of the second content selection menu in accordance with the determined position; and outputting the second content selection menu.

9. The method of claim 8, further comprising:
storing historical interest input data indicating user interest in AV programs;
generating a subsequent content selection menu based at least in part on the historical interest input data; and
outputting the subsequent content selection menu.

10. The method of claim 8, further comprising:
determining a coordinate position for each AV program of the plurality of AV programs with respect to each dimension of the content selection menu; and
placing an identifier of the AV program in the content selection menu in accordance with the coordinate position.

11. The method of claim 8 wherein the plurality of content attributes are determined based at least in part on a history of AV program selection of a user.

12. The method of claim 8 wherein providing the content selection menu for display further includes:
decoding, by at least one tuner, at least one AV program of the plurality of AV programs that is live broadcast; and
displaying the decoded at least one AV program, positioned within the content selection menu, on a display device.

13. A system for generating a multidimensional content selection menu, the system comprising:
a receiver having control circuitry;
a memory coupled to the control circuitry, the memory having compute-executable instructions stored thereon that, when executed, cause the control circuitry to cause the system to:

determine a number of dimensions of the content selection menu;
associate each dimension with a content attribute of first set of a a plurality of content attributes;
select a plurality of AV programs, an AV program of the plurality of AV programs is selected based at least in part on a score of the AV program associated with at least one content attribute of the plurality of content attributes;
position the plurality of AV programs in the content selection menu;
output the content selection menu for display;
receive interest input of an AV program of the plurality of AV programs from a target user;
generate a second content selection menu based at least in part on the interest input, wherein the generating the second content selection menu includes:
obtaining a second set of a second plurality of content attributes based on the interest input, wherein the obtaining the second set of a second plurality of content attributes based on the interest input includes:
determining a plurality of content attributes of the AV program of the interest input;
for each content attribute of the plurality of content attributes of the AV program of the interest input, determining an associated score of the AV program of the interest input that represents a degree of association between the AV program of the interest input and the content attribute; and
selecting the second set of the second plurality of content attributes to include content attributes for which the AV program of the interest input has the highest two determined associated scores, which causes the second set of the second plurality of content attributes to differ from the first set of the plurality of content attributes;
associating each second content attribute of the second set with an axis of a plurality of axes of the second content selection menu, which causes the plurality of axes of the second content selection menu to be associated with different content attributes than a plurality of axes of the content selection menu:
identifying a plurality of second AV programs different from the plurality of AV programs, each second AV program having an associated score for each second content attribute;
determining, for each second AV program, a position along each axis of the plurality of axes of the second content selection menu based on the score of the second AV program for the second content attribute corresponding to the respective axis of the second content selection menu for that attribute; and
populating the second content selection menu with the plurality of second AV programs by positioning each second AV program in a space defined by the plurality of axes of the second content selection menu in accordance with the determined position; and
output the second content selection menu.

* * * * *